US005248458A

United States Patent [19]

Daly

[11] Patent Number: 5,248,458

[45] Date of Patent: Sep. 28, 1993

[54] METHOD OF CALCULATING OPTIMUM POST APERTURES OF A BOARD-MOUNTABLE ELECTRICAL CONNECTOR

[75] Inventor: John K. Daly, Scottsdale, Ariz.

[73] Assignee: The Whitaker Corporation, Wilmington, Del.

[21] Appl. No.: 987,910

[22] Filed: Dec. 8, 1992

[51] Int. Cl.[5] .............................................. B29C 45/36

[52] U.S. Cl. .............................. 264/40.1; 264/272.15; 264/328.1; 364/476; 439/79

[58] Field of Search ................................ 439/79, 381; 364/474.35, 474.36, 476; 264/40.1, 272.11, 272.15, 328.1

[56] References Cited

U.S. PATENT DOCUMENTS 4,054,345 10/1977 Sherwood .......................... 439/381

4,609,243 9/1986 Wyss .................................. 439/381

4,908,335 3/1990 Cosmos et al. ....................... 439/79

5,124,108 6/1992 Bennett et al. ...................... 425/577

*Primary Examiner*—Jill L. Heitbrink

*Attorney, Agent, or Firm*—Anton P. Ness

[57] ABSTRACT

A post locating section (200) of a header (10) includes an array of post-receiving apertures (222,224,242) extending to a mounting face (30). Post sections (110,110′,148) of header contacts (100,130,140,160) extend through the apertures of the post locating section (200) and beyond the mounting face for insertion into through-holes of a circuit board (40) upon mounting the header (10) thereto. The apertures (222,224,242) are referenced to a structure (270) of the post locating section defining a datum and are optimally dimensioned. The method of dimensioning the apertures includes assessing the manufacturing tolerance limits of the drilled circuit board through-hole diameters and locations, and of the dimension of the post sections, and determining the maximum permissible displacement of the post sections which will still permit entry of the tip sections (112,112′,150) into the through-holes (36,38), and bounding the limits of the permissible displacement with the aperture side walls in a manner permitting float of displaced post sections during insertion through the through-holes.

1 Claim, 13 Drawing Sheets

METHOD OF CALCULATING OPTIMUM POST APERTURES OF A BOARD-MOUNTABLE ELECTRICAL CONNECTOR

FIELD OF THE INVENTION

The present invention is related to electrical connectors and more particularly to connectors to be mounted to printed circuit boards with contacts having post sections to be inserted through board through-holes.

BACKGROUND OF THE INVENTION

There are many electrical connectors, generally referred to as headers, known in which a plurality of contacts in an array are retained in a housing in a plurality of rows, each contact extending from a first contact section exposed at a mating face for mating with complementary contact sections of contacts of another connector, to and including a post section extending to a board-mounting face of the connector from a right-angle bend. Thus a plurality of posts coextend below the mounting face arrayed in rows and are arranged to be inserted into respective through-holes of a printed circuit board for electrical connection to conductive traces of the board. Each board includes an array of through-holes spaced apart in a standard pattern at fixed spacings from each other, and the array of post sections of the connector must coincide with the standard hole pattern in order for the post sections to be inserted into respective holes during mounting of the connector.

One such connector is disclosed in U.S. Pat. No. 5,037,334 in which the contacts are initially inserted into respective housing passageways while still having a linear shape; the post sections extend from the housing and are thereafter bent to define the requisite right-angle bends. A plate section extends from the housing oriented to be parallel to the circuit board, and as the post sections are being bent, they are urged into channels of the plate section until the posts are fully bent, whereafter the channels are designed having stop features at selected locations along their lengths to locate and hold the post sections in the fully bent position. Such plate section provides positioning of the post sections generally corresponding to the hole array, with the plate section molded with the channels defined at a desired spacing in one direction, and the channel retention features located at desired spacings inwardly from the channel entrances so that the post sections are thus positioned in the orthogonal direction, altogether achieving generally accurate X,Y positioning of the posts.

The connector disclosed in U.S. Pat. No. 4,080,041 includes a separate retainer plate removably mounted on the housing of the connector. The plate includes openings through which the bent tails of the right-angle contacts extend for positioning the tails in a predetermined pattern. An upstanding front edge includes a rib which snaps into a groove into a rearwardly facing surface of the housing as an array of fingers are received upwardly into a slot across the bottom surface of the body of the housing, which engage central portions of respective contacts behind annular collars thereof for retention of the contacts in the housing passageways. Side edges of the plate include arms which snap into grooves on vertical walls of the housing along the rear face to retain the plate on the housing. The round apertures of the plate are said to accurately support and position the cylindrical contact tails close to their ends.

It is desired to provide a connector which precisely locates the post sections of its right-angle contacts.

It is further desired to provide such a connector which is moldable to have a post locating section which assures that the contact post sections extending from the mounting face are able to enter and extend through the board through-holes without difficulty during board mounting of the connector.

SUMMARY OF THE INVENTION

The method of the present invention provides a housing having a first part defining the main housing section including passageways into which the contacts are respectively inserted, and a second part defining a post locating section with an array of apertures through which respective post sections of the contacts will be inserted.

In the embodiment disclosed, the connector includes a discrete main housing member and a discrete post locating member securable thereto at an assembly interface, which includes an engagement surface extending across the forward end of the second housing part or post locating member to oppose a corresponding surface across the rear face of the first part or main housing, with the members secured together upon assembly to assure that the engagement surface and the corresponding surface abut each other along the length of the assembly interface under compression as the members are locked together such as with interengaging latching sections. The post locating member is placed over the ends of the post sections and is brought toward the main housing along the array of post sections and becomes latched thereto. The abutting surfaces first engage and then are slightly compressed against each other by cooperating guide features of the parts until latched in a compression fit; the guide features may be interfitting tongue-in-groove sections. Such a connector is disclosed in U. S. patent application Ser. No. 987,971 filed Dec. 8, 1992 (concurrently herewith) and assigned to the assignee hereof.

The second part or post locating member includes a reference feature or datum to which the post-receiving apertures are referenced, while the passageways of the main housing are referenced to a feature or datum of the main housing to assure location of the passageways along the mating face. The reference datum of the post locating member will be utilized by automatic placement apparatus during board mounting to a circuit board.

Each post-receiving aperture has not only its center precisely located with respect to the reference datum of the post locating section, but its dimensions calculated so that its corresponding post section although commonly spaced from the wall surfaces, cannot be situated outside an optimized envelope defined by the aperture wall surfaces to assure that the reduced dimension tip of the free end of the post section will not only enter the printed circuit board through-hole during connector mounting, but the post section proper, spaced away from the reduced dimension tip, will also pass through the through-hole without noticeable interference or insertion resistance. The worst tolerance case of a board hole for post insertion is the smallest hole diameter within acceptable tolerances coupled with the most displaced hole center from nominal within tolerances in all directions, defining a guaranteed opening to be called the "maximum material condition (MMC) boundary". The worst tolerance case of a post section is the smallest dimension post cross-section and the most displaced tip, within manufacturing tolerances, called the "least material condition (LMC) boundary". When the walls of the aperture are centered with respect to the MMC boundary and also precisely bound the LMC boundary, the aperture walls assure that the post section extending therethrough has already been adjusted in position if necessary during connector assembly so that the tip of any within-tolerance post section will enter any within-tolerance printed circuit board through-hole, and that the post section will pass through the through-hole without interference by being able to adjust its position, or float, within the aperture.

It is an objective of the present invention to provide a post locating section of the connector housing which is molded as a separate part with post-receiving apertures, with each aperture defined with respect to the printed circuit board through-hole and the post section such that the post section at its worst case material tolerance and its worst case displacement from nominal will assuredly be received into the corresponding board hole which also is at its worst case diameter tolerance and worst case displacement from nominal.

The method of the present invention will now be described by way of example with reference to the accompanying drawings.

BRIEF DESCRIPTION OF THE DRAWINGS

FIG. 3 is an elevation side view of the connector of FIGS. 1 and 2;

DETAILED DESCRIPTION OF THE PREFERRED EMBODIMENT

Figure 1:
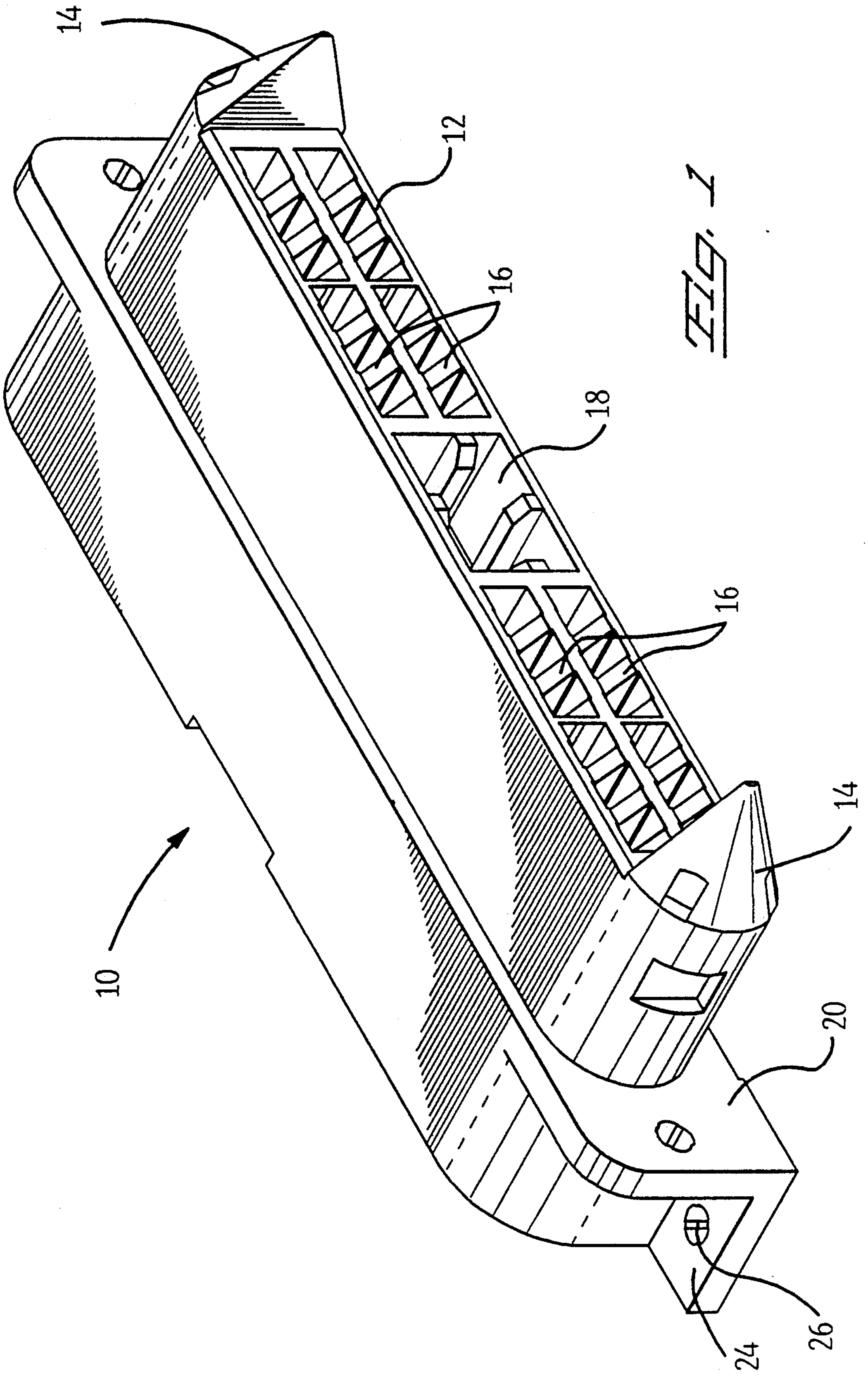
FIGS. 1 and 2 are isometric views of the mating face and mounting face respectively of a drawer-style connector in which is utilized the method of the present invention.
Figure 2:
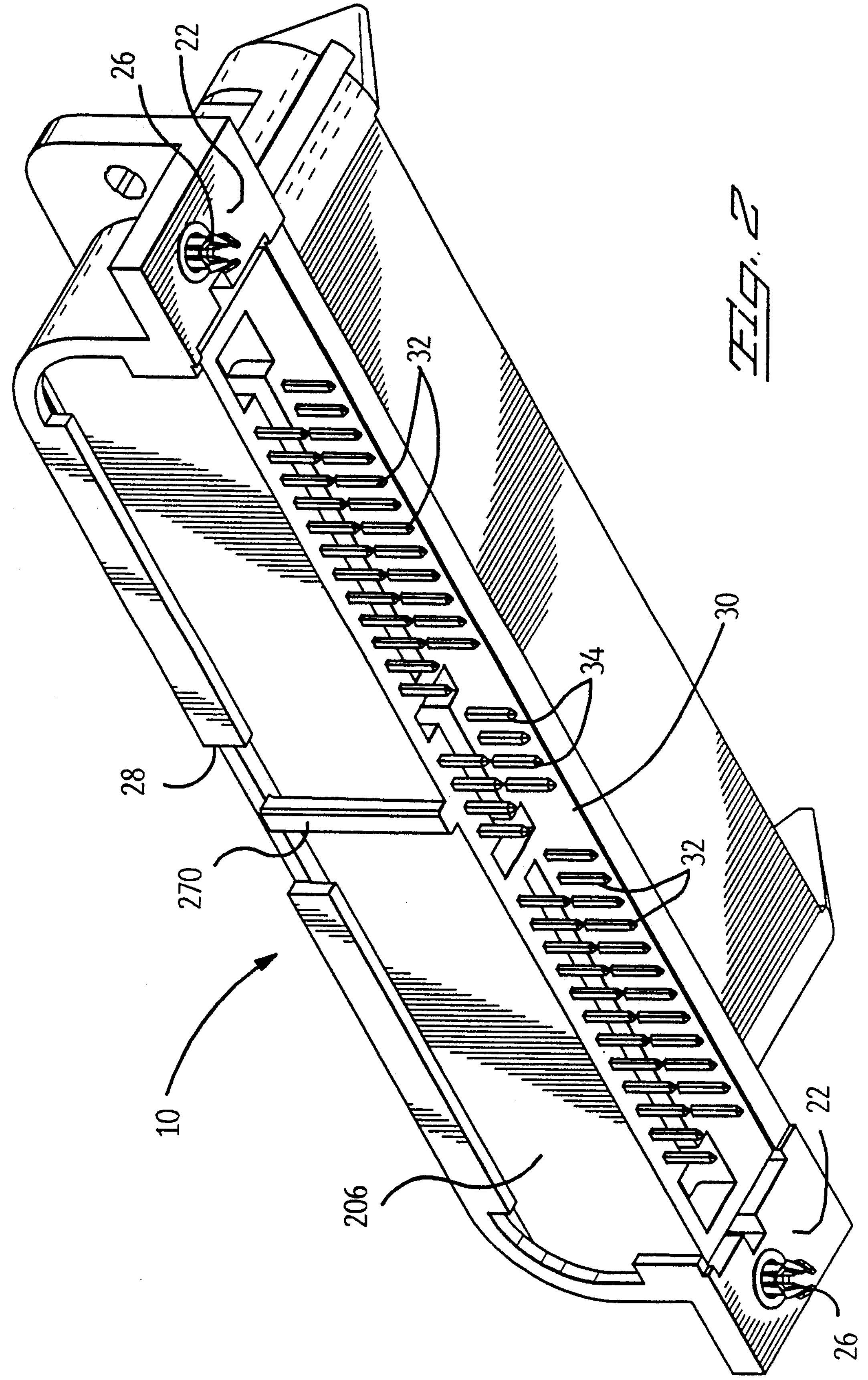
Figure 4:
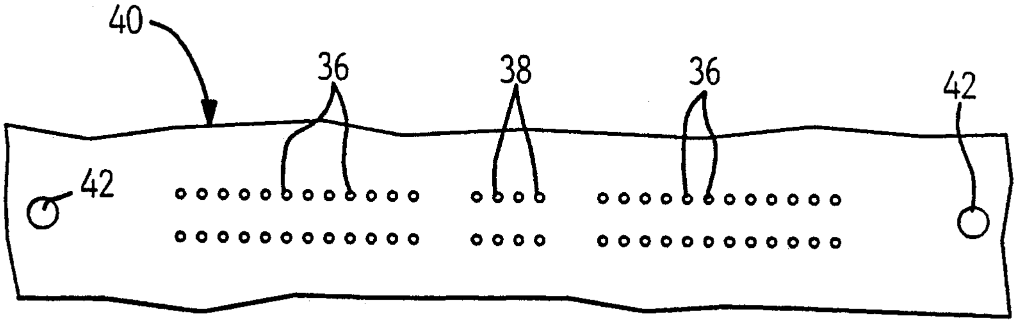
FIG. 4 is a plan view of an array of through-holes of a circuit board to which the connector is to be mounted, illustrating two rows of holes at selected spacings.

A drawer style connector 10 is illustrated in FIGS. 1 to 3 having a mating interface 12 inclusive of rugged alignment posts 14 adapted to align a mating connector (not shown) having corresponding semicircular-shaped ends to a receptacle housing section at its mating face and further adapted to polarize the mated assembly, as is known in U.S. Pat. No. 5,080,604. Four blade-receiving cavities 16 are shown on either side of large central cavity 18 into which will be inserted a plug section of a sense module (also not shown) of the mating connector. Such connector 10 as shown is useful in power transmission and includes an array of sense lines detecting that power is being transmitted along the circuits during in-service use. Lateral ends 20 of the connector are shown to include flanges 22 having holes 24 for using conventional board lock accessories 26 to mount the connector to a circuit board. Post sections 32,34 are seen depending from mounting face or bottom surface 30 in FIG. 2 for receipt into corresponding through-holes 36,38 of circuit board 40, seen in FIG. 4, which also includes mounting holes 42 into which respective board locks 26 will be inserted to secure connector 10 to board 40. Notch 28 at the rear of the top wall permits access by tooling of automatic placement apparatus from above (not shown) to rib 270 along the back wall 206 which comprises a datum or reference by which the apparatus grips the connector for placement at a precise location and in a precise orientation on a printed circuit board during connector mounting with the post sections thus aligned with respective through-holes of a corresponding board array.

Figure 5:
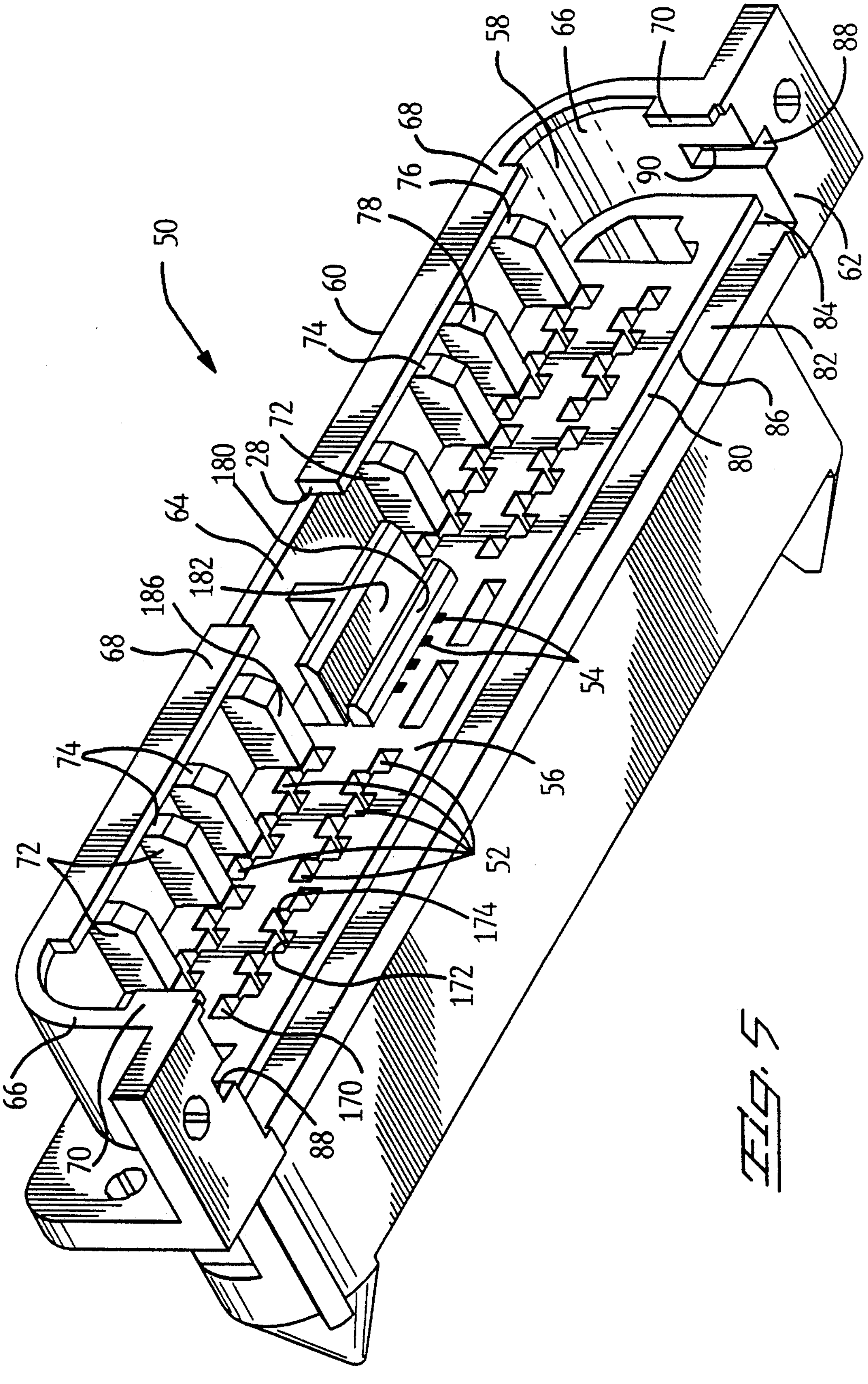
FIG. 5 is an isometric view of the rear face of the main housing of the connector from below, showing the rear exits of the contact-receiving passageways.
Figure 6:
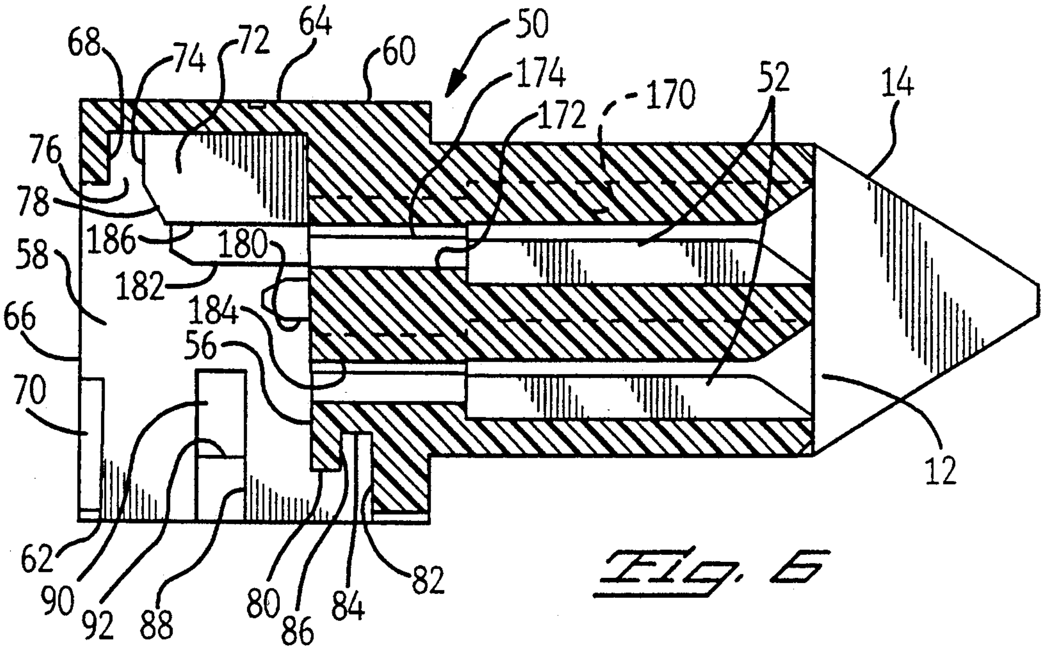
FIG. 6 is a longitudinal section view of the main housing part of FIG. 5 through upper and lower passageways.
Figure 7:
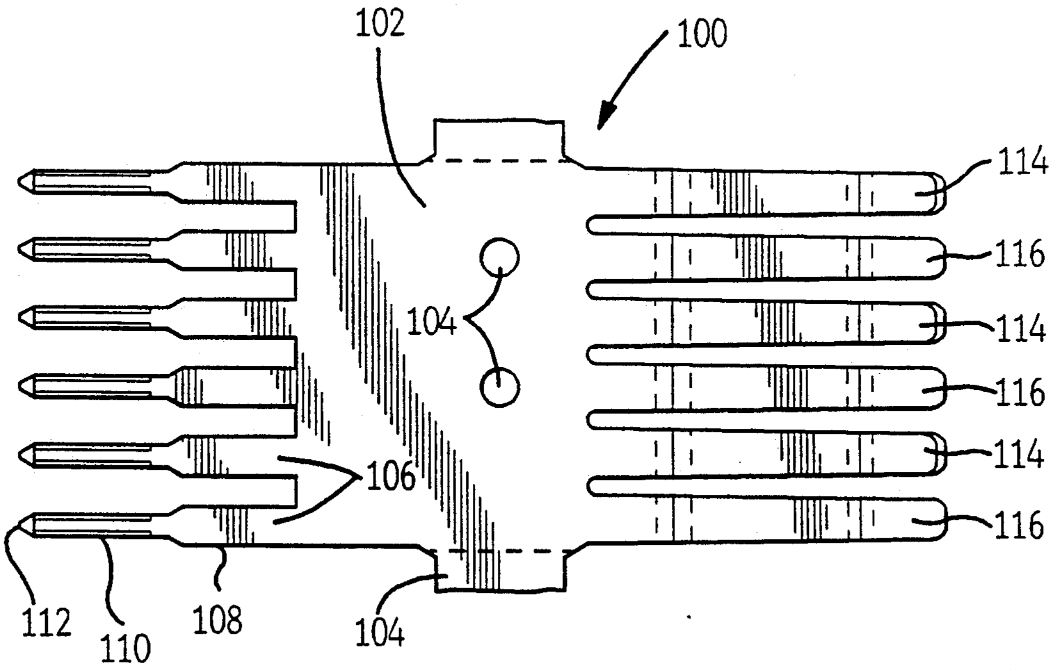

Main housing member 50 is shown in FIGS. 5 and 6 in a manner making clear the array of passageways 52,54 along contact exit face 56 and which extend forwardly to mating face 12. A large recess 58 is defined within rearward section 60 and is open to the bottom surface 62 of the main housing in which body sections of the contacts will be disposed and within which the right-angle bends of the contacts will be situated. Rearward section 60 includes a top wall 64 and opposed side walls 66, and extends to a rearward end of top wall 64 which includes retention flanges 68, and along the rearward ends of opposed side walls 66 are seen retention flanges 70. Rib sections 72 extend from exit face 56 along the inside surface of top wall 64 to rearwardly facing edge surfaces 74 spaced a selected distance from depending retention flanges 68, so that an effective slot 76 is defined between the forwardly facing inner surfaces of the pair of flanges 70 and the multiple rearwardly facing edge surfaces 74. Also seen are chamfered corners 78 of edge surfaces 74 for lead-in purposes as will be discussed below.

Along the bottom edge of exit face 56 is shown a cutout extending forwardly to rearwardly facing surface 82, and a channel 84 spaced forwardly from exit face 56 extends upwardly into main housing 50 between surface 82 and an opposing surface 86, all defining a lip 80 depending below main housing 50. Also seen along the inside surface of each side wall 66 is a channel 88 extending upwardly from bottom surface 62 to an aperture 90 through side wall 66 having an upwardly facing latch surface 92.

Figure 7:
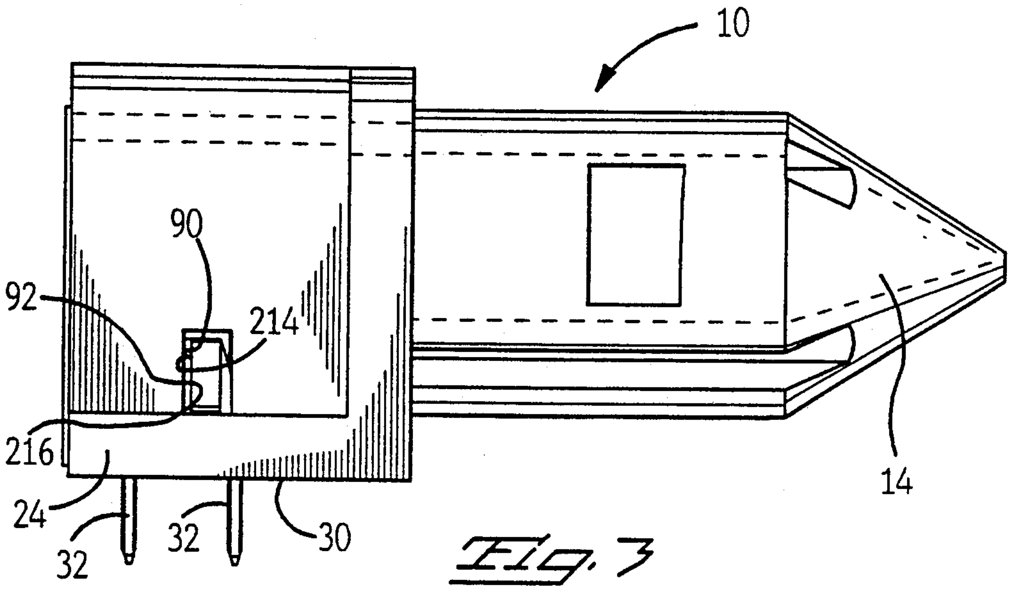
FIGS. 7 and 8 are plan and elevation views of a contact member having a plurality of spring arm contact sections and post sections for transmission of power, insertable into one side of one row of the passageways of the main housing.
Figure 8:
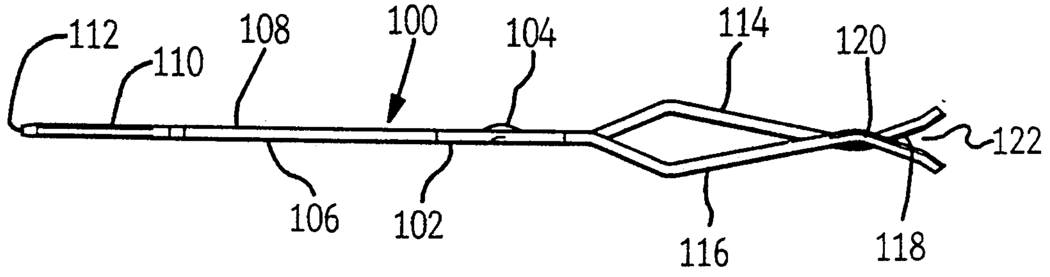

Referring to FIGS. 7 and 8, a first type of contact member utilized in connector 10 is a power contact 100 having a wide body section 102, and a plurality of power contacts 100 can be manufactured on a carrier strip; dimple-shaped embossments 104 are seen on body section 102. Power contact may be stamped from a strip of low resistance copper alloy having a thickness of 0.018 inches, for example. Power contact 100 is shown to have an array of post sections 106 coextending rearwardly from body section 102 having wide first sections 108 (such as 0.056 inches) and tapered to narrower second sections 110 (such as 0.024 inches) concluding in free ends 112, with corner edges of second sections 110 preferably swaged to define chamfers therealong. Reduced dimension tip sections are defined on free ends 112 having angled surfaces to facilitate entry into post-receiving passageways of the post locating member during connector assembly, and also into board through-holes during board mounting of the assembled connector.

Forwardly from body section 102 coextend an array of six spring contact arms 114,116 which are formed as seen in FIG. 8 to define upper contact arms 114 alternating with lower contact arms 116 as disclosed in U.S. Pat. No. 5,080,604 and also No. 4,887,976, and which conclude in forward upper and lower contact sections 118,120 defining therealong a blade-receiving slot 122. Lower contact arms 116 are adapted to be deflected downwardly upon receipt of a common blade-shaped mating contact section (not shown) received into the blade-receiving slot, and similarly upper contact arms 114 are adapted to be deflected upwardly. Body section 102 of power contact 100 is relatively short axially and is adapted for placement in the lower one of rows of contact-receiving passageways 16, so that after being bent to define a right-angle bend across body section 102, post sections 106 will extend so that free ends 112 thereof will be disposed a selected length below bottom surface 62 of connector 10 after assembly.

Figure 9:
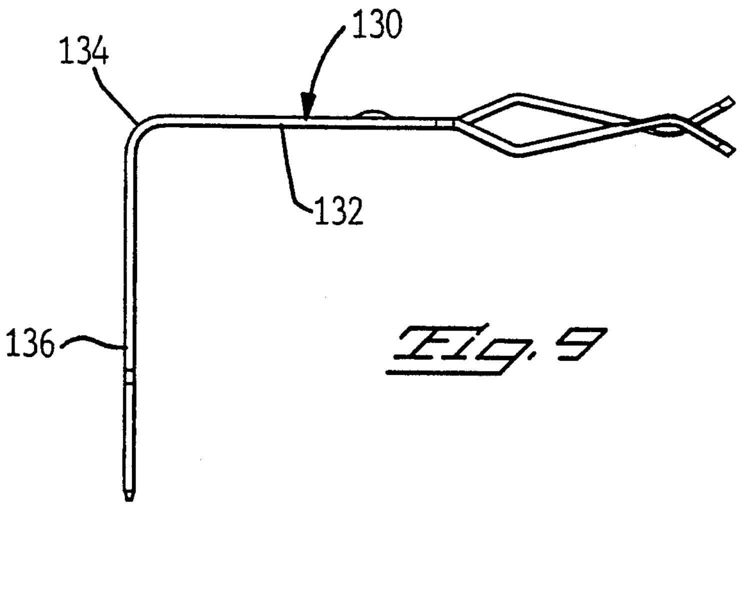
FIGS. 9 and 10 are elevation and isometric views of the contact member of FIGS. 7 and 8 after the forming of the right-angle bend for the post sections.
Figure 10:
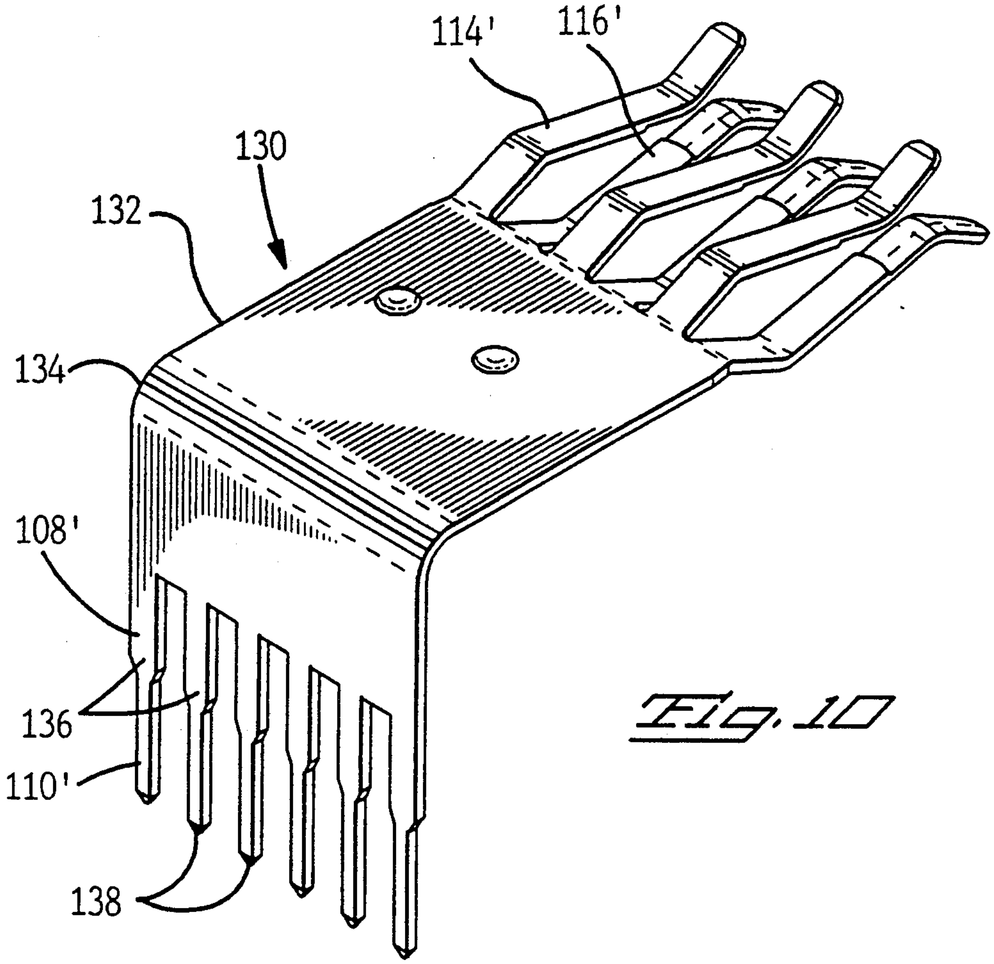

In FIGS. 9 and 10 is shown power contact 130 having a body section 132 which is relatively long axially and is adapted for placement in the upper one of rows of contact-receiving passageways 16. Power contact 130 has been formed to define a right-angle bend 134 across body section 132; post sections 136 will extend so that free ends 138 thereof will be disposed a distance below bottom surface 62 of connector 10 equal to that of free ends 112 of post sections 106 of power contact 100; post sections 136 include wide upper portions 108′ and narrower lower portions 110′ identical to portions 108,110 of the post sections of power contact 100 of FIGS. 7 and 8. Extending forwardly from body section 132 are upper and lower spring contact arms 114′,116′ identical to those of power contact 100.

Figure 11:
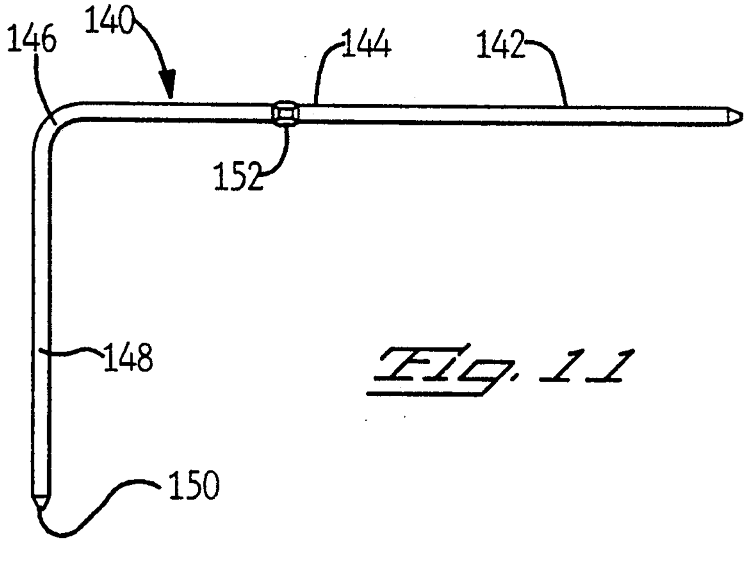
FIG. 11 is an elevation view of a sensor contact member insertable into a respective passageway at the center of the main housing and having a right-angle bend therein.
Figure 16:
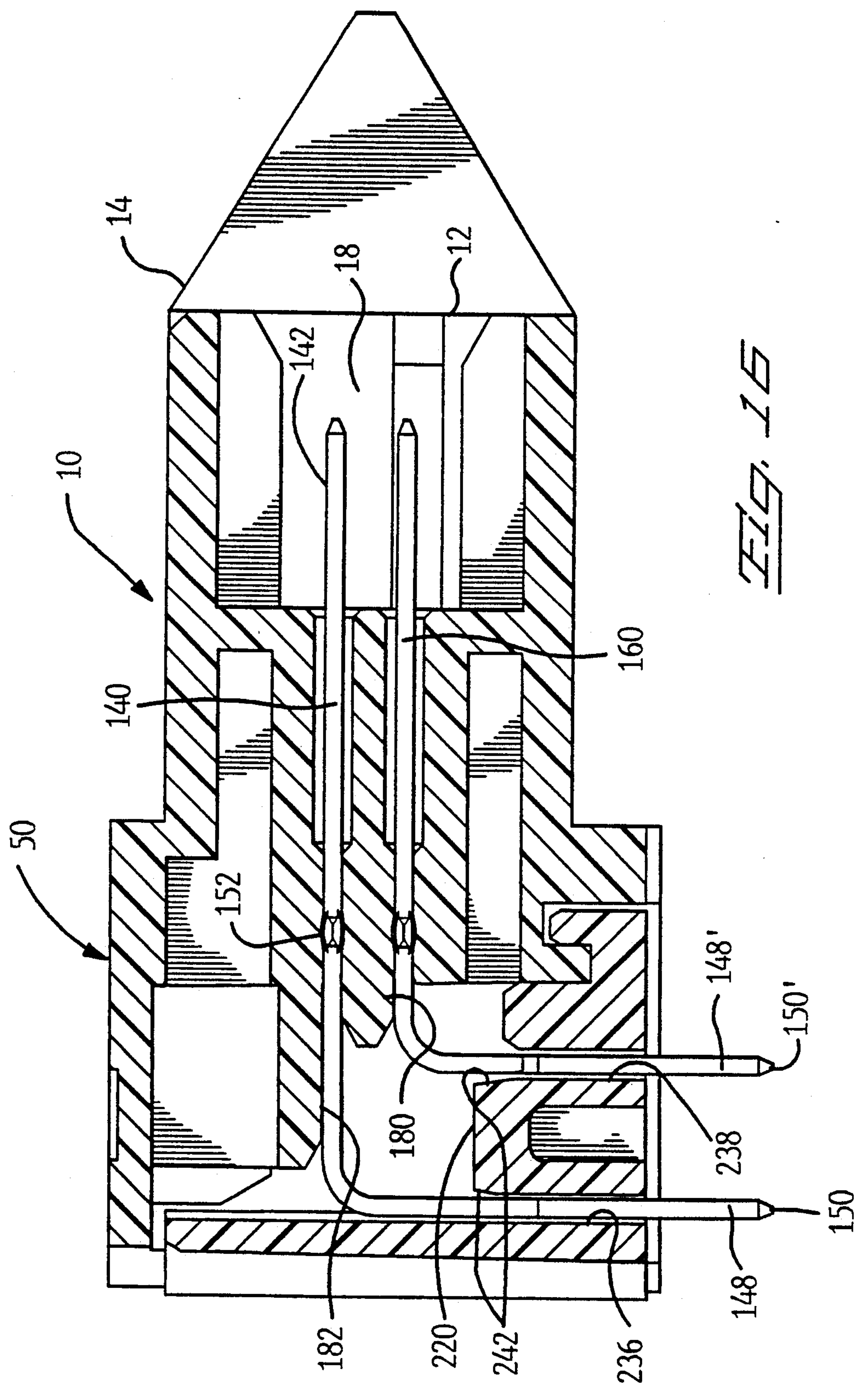

A second style of contact is shown in FIG. 11 and defines a discrete sensor or signal contact member 140, which may be stamped from square stock of 0.025×0.025 inches. Sensor contact 140 includes a single forward contact section 142, body section 144 including a right-angle bend 146, and single post section 148 having a free end 150 having a reduced dimension tip section, with the end length portion preferably die struck to define substantial chamfers along the corner edges and effectively reducing the diagonal distance across the cross-section. Sensor contact 140 in FIG. 11 will be disposed in the upper row of contacts of connector 10, while sensor contact 160 will be disposed in the lower row as seen in FIG. 16 and is identical to sensor contact 140 except for a body section of shorter axial length both forwardly and below the right-angle bend. Also seen in FIG. 11 is an embossment 152 struck into a selected axial location along body section 144 which defines an X-shaped cross-section defining an effective widened portion for interference fit within a respective contact-receiving passageway 54 (see FIG. 16).

Figure 12:
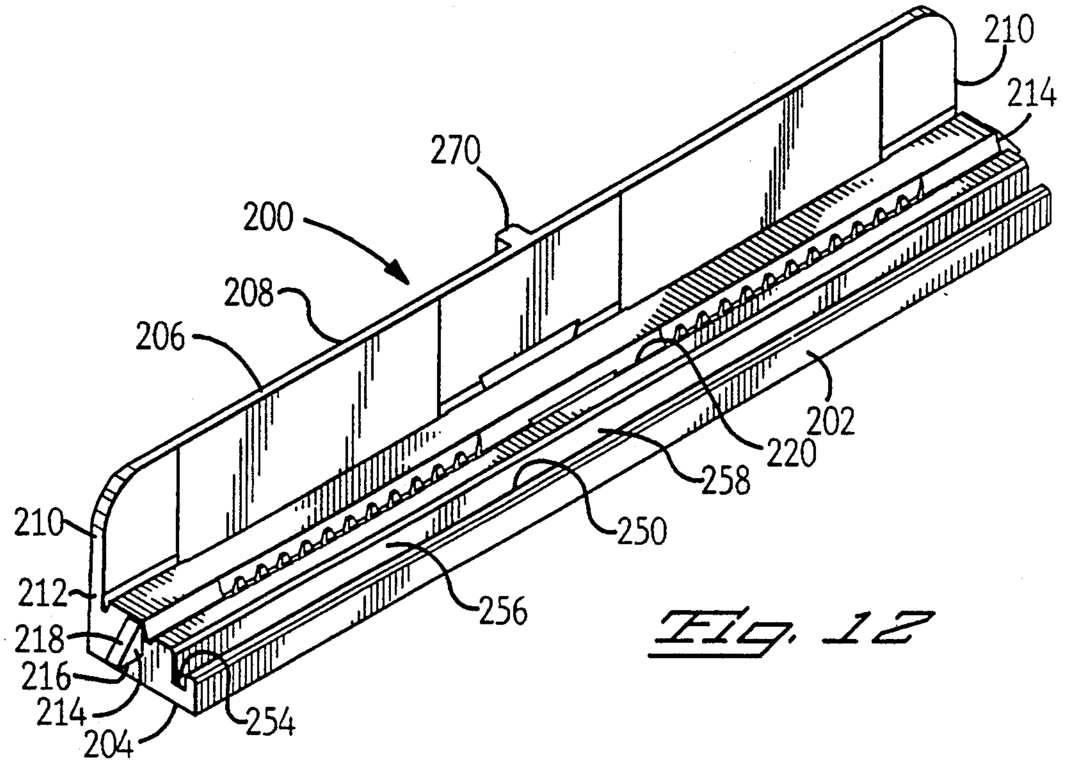
FIGS. 12 and 13 are isometric views of the inner face and mounting face respectively of the post locating member of the connector of FIGS. 1 and 2, having a two-row array of post-receiving apertures.
Figure 13:
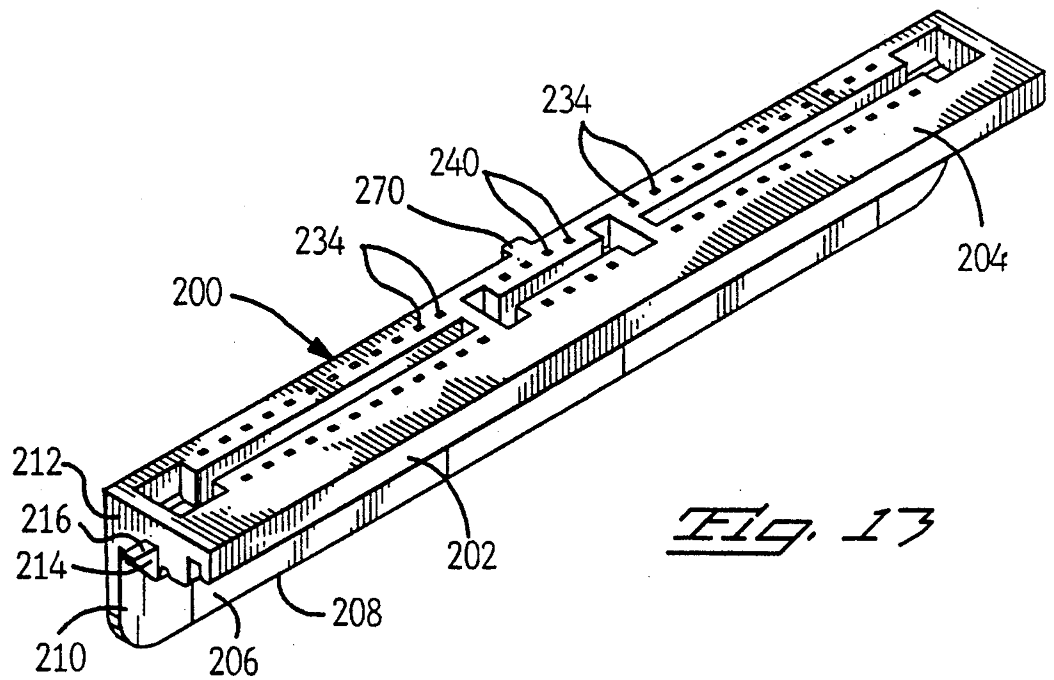
Figure 14:
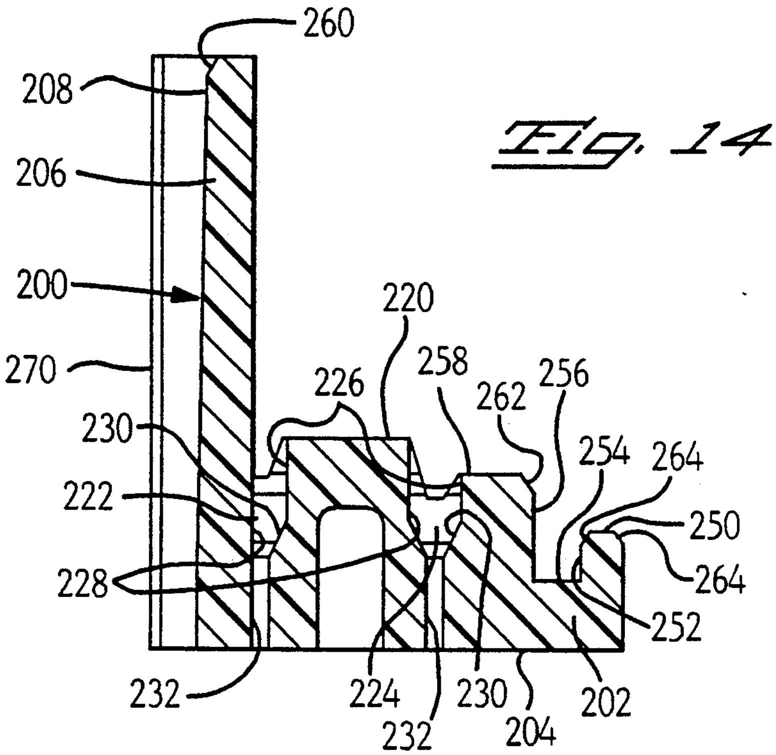
FIG. 14 is a longitudinal section view of the post locating member of FIGS. 12 and 13 through a pair of post-receiving apertures.

Post locating member 200 is shown in FIGS. 12 to 14, and includes a body section 202 whose bottom surface 204 will substantially define the board-mounting face of the assembled connector. Back wall 206 extends upwardly from a rear edge of body section 202 to a top edge portion 208 and includes side edge portions 210 all shaped to just fit within top wall 64 and side walls 66 of rear section 60 of main housing member 50 upon assembly. Side surfaces 212 of body section 202 will also fit within side walls 66 and include latching projections 214 having downwardly facing latch surfaces 216 and tapered upper surfaces 218. During assembly of post locating member 200 into main housing member 50, upper surfaces 218 will engage and bear against inside surfaces of side walls 66 within channels 88 and temporarily deflect side walls 66 outwardly until latching projections 214 are aligned with and snap into apertures 90, latchingly engaging the cooperating latch surfaces 216 and 92, as seen in FIG. 3.

Post-receiving passageways extend through body section 202 of post locating member 200 from contact-receiving face 220 to bottom surface 204 and are associated with the post sections of the power and sensor contact members of connector 10. Post-receiving passageways 222,224 are associated with the post sections of power contacts 100,130 and include tapered lead-in surfaces 226 at entrances thereto along contact-receiving face 220 to facilitate initial insertion thereinto of free ends 112,138 of post sections 110,136 during connector assembly. Post-receiving passageways 222,224 include relatively wide upper portions 228 within which wide post portions 108,108′ will be disposed, transition portions 230 defined by inwardly tapered wall surfaces, and narrower lower portions 232 through which narrower post portions 110,110′ will extend which communicate with bottom surface 20 at post exits 234. Transition portions 230 facilitate passing of free ends 112,138 into narrower lower passageway portions 232.

Side walls of the narrower lower passageway portions 232 are dimensioned apart to provide a calculated clearance about narrower post sections 110,110′, to assure that post sections 110,110′ extending therethrough extend beyond exits 234 accurately positioned to match the pattern of through-holes 36 of the array on the circuit board 40 (FIG. 4), to assure that the tip sections thereof will enter the corresponding through-hole and to assure that the side walls will not interfere with any adjustment in lateral position of the full cross-section of the post section caused by the tapered tip section bearing against the entrance to the through-hole, all to facilitate mounting of connector 10 onto board 40.

Post-receiving passageways 236,238 (FIG. 16) are associated with the post sections of sensor contacts 140,160 and similarly accurately position post sections 148,148' as they extend below post exits 240. Through-holes 36,38 for example may be spaced apart 0.100 inches within each row, with the two rows spaced apart 0.200 inches, and have a diameter of 0.036 inches for example; the through-holes conventionally are drilled into a circuit board at positions referenced to mounting holes 42.

The free ends of all post sections of connector 10 must have their centers within a target less than diameter of the nominal through-hole position to compensate for tolerance variations during drilling of the respective through-holes, so that the tip sections are received without stubbing into the through-holes when connector 10 is being mounted onto board 40 with board locks 26 received into mounting holes 42. The passageways have tapered lead-in surfaces 242 at entrances thereto along contact-receiving face 220 to facilitate insertion thereinto of free ends 150,150' during connector assembly. The post sections may be die-struck to slightly flatten the otherwise sharp edges of the rectangular or square cross sections thereof.

An upstanding rib 250 is defined along the forward end of post locating member 200 having a rearwardly facing surface 252 thereof within groove 254 formed between rib 250 and forwardly facing surface 256 of raised portion 258 of body section 202.

During the injection molding process it is preferred to provide a mold gate at the end of the mold cavity entering onto the bottom of rear wall 206 containing vertical rib 270, for precision molding of vertical rib 270 at zero draft for use as a reference surface for automatic placement apparatus. Post-receiving apertures 222,224 are precisely located with reference to vertical rib 270. To enable precisely controlled shrinkage, vertical rib 270 is provided along and at the center of the rear surface of rear wall 206, for the molded post locating member to shrink incrementally equally from both ends equalizing and thus minimizing the incremental displacement effect on the post-receiving apertures at the ends of the rows. Post locating member 200, as well as main housing member 50, may be molded for example of thermoplastic resin such as VALOX DR48 glass-reinforced polybutylene terephthalate (trademark of General Electric Company, Pittsfield, Mass.).

Figure 15:
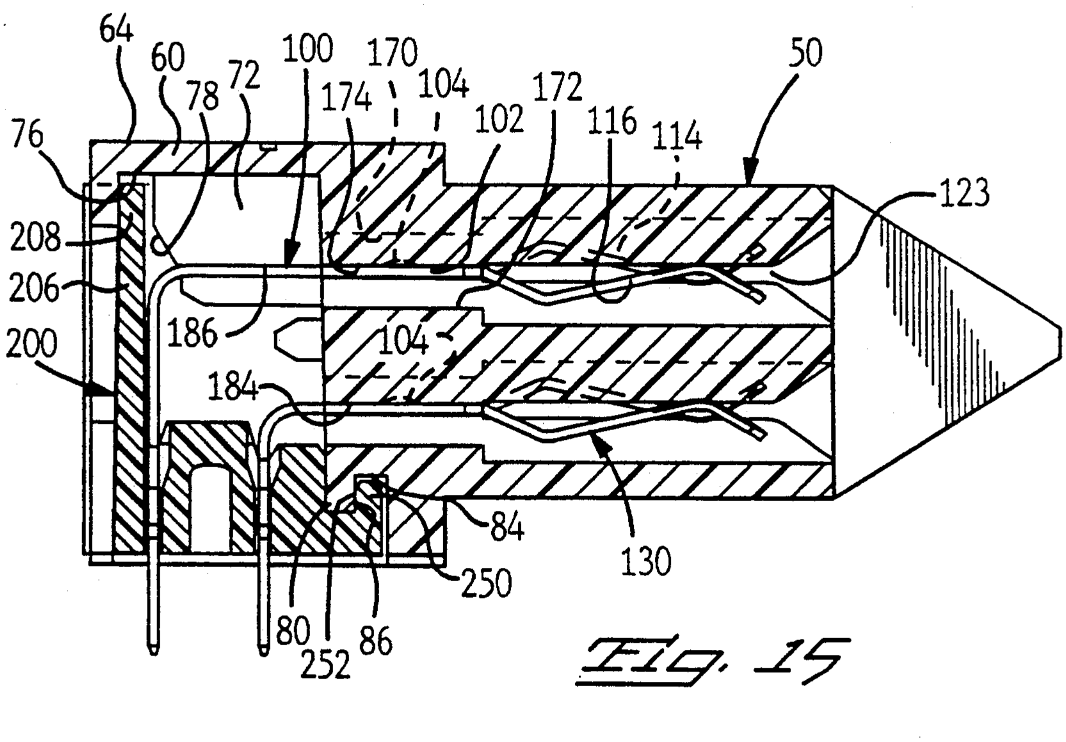
FIGS. 15 and 16 are longitudinal section views of the fully assembled connector of FIGS. 1 and 2, through upper and lower ones of the power contact members of FIGS. 9 and 10, and through upper and lower ones of the sensor contacts of FIG. 11 respectively.

FIGS. 15 and 16 illustrate connector 10 in cross-section through power contacts 100,130 and through sensor contacts 140,160 respectively. Power and sensor contacts have right-angle bends provided at selected locations along the respective body sections. Power contacts 100,130 are loaded into main housing 50 by insertion of leading ends of upper and lower contact arms 114,114';116,116' respectively into corresponding upper and lower passageway portions 170,172 of contact-receiving passageways 52. Body sections 102,132 enter slots 174 which intersect all Of the upper and lower passageway portions 170,172 for the particular power contact, and dimpled embossments 104 serves to define a limited interference fit of the body section within the slot. Sensor contacts 140,160 are inserted into discrete passageways 54, with embossments 152 providing retentive interference fits within the passageways.

Post locating member 200 is assembled to main housing 50 by being positioned adjacent the array of free ends 112,138 of lower contacts 100,130 and free ends 150,150' of sensor contacts 140,160 with the lead-in entrances of the post-receiving passageways receiving the free ends thereinto as post locating member 200 is translated therealong toward large recess 58 of main housing 50. Sensor contacts 140,160 are supported by structure of the main housing at surfaces 180,182, and power contacts 100,130 are supported at surfaces 184,186 while their post sections are being forced through post-receiving passageways of post locating member 200, assuring proper vertical positioning of the post sections with respect to post locating member 200. The post-receiving passageways are elongate providing substantial vertical alignment of the post sections extending therethrough and assuring that the portions of the post sections extending beyond the mounting face are essentially vertical.

Top portion 208 of rearward wall 206 will be received into slot 76 facilitated by chamfered edge 260, and side portions 210 will pass forwardly of flanges 70 against the inside surfaces of side walls 66 of main housing 50. Latch projections 214 will pass along channels 88 and latch into apertures 90. Rib 250 will enter groove 84 as lip 80 simultaneously enters groove 254 facilitated by chamfered edge 262. Rearwardly facing surface 252 of rib 250 passes over and bears tightly against surface 86. Because of the desired tight fit of surface 252 against surface 86, chamfered surfaces 264 are formed along the corner edges of rib 250 to facilitate rib 250 initially entering groove 84.

Figure 17:
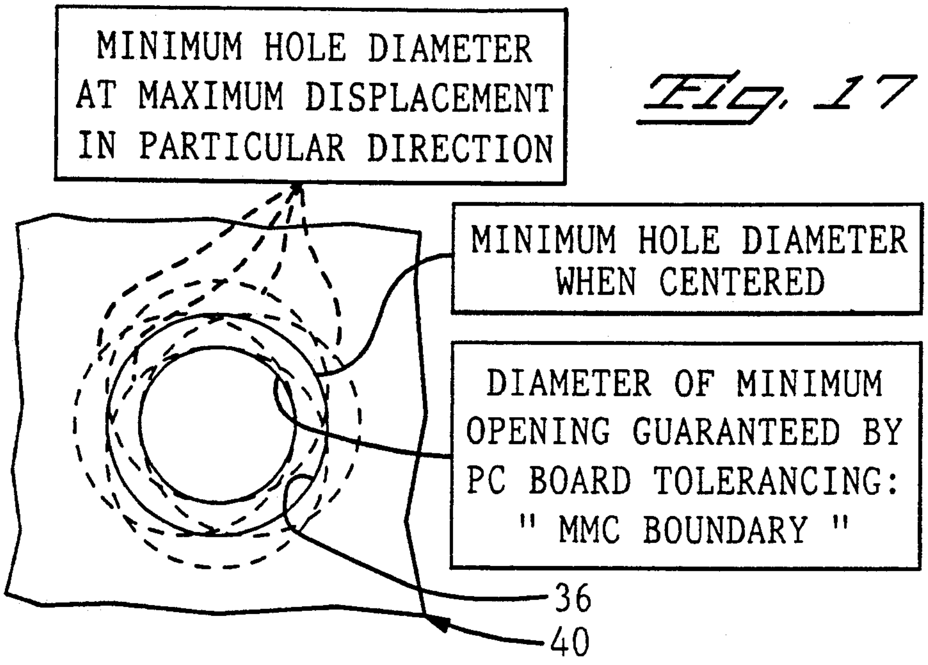
FIGS. 17 to 19 are diagrams illustrating the method of the present invention for calculating the precisely formed aperture geometry of the post locating member, with FIG. 17 considering the tolerances in size and position of the printed circuit board through-hole, FIG. 18 considering the tolerances in size and off-center displacement of a post section, and FIG. 19 defining the optimum aperture and its relationship to the printed circuit board through-hole and a post section.
Figure 18:
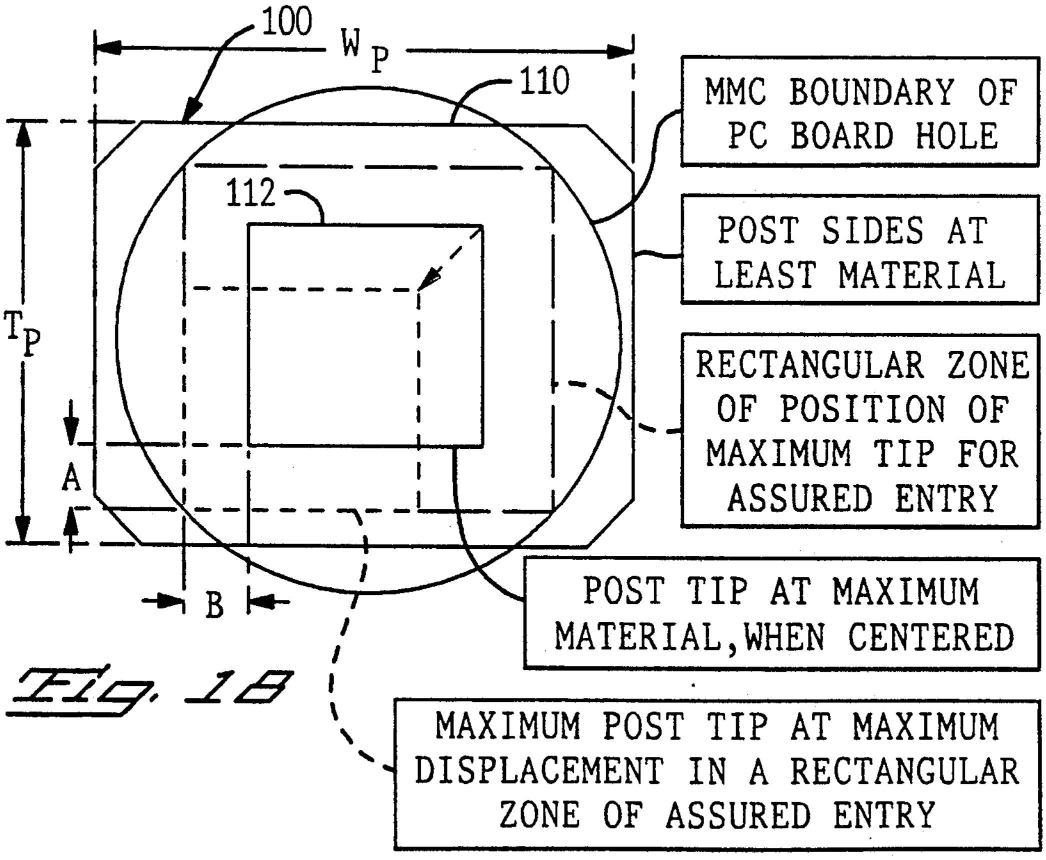
Figure 19:
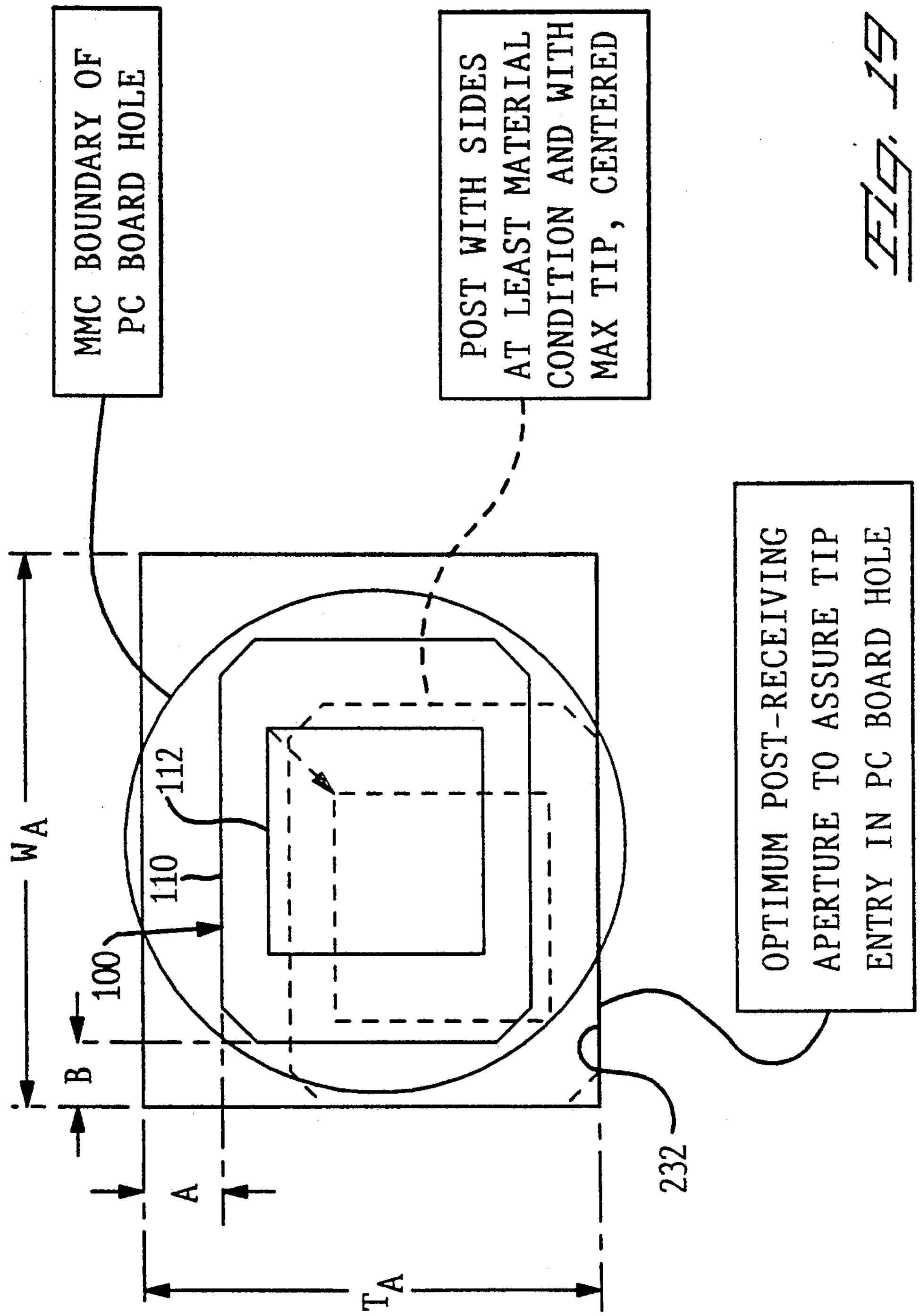

FIGS. 17 to 19 illustrate the calculating of an optimum envelope for the cross-section of a post-receiving aperture which assures that a post section extending therethrough in the fully assembled connector, will be received into a corresponding through-hole of a printed circuit board during board mounting. In FIG. 17 a typical board hole 36 of a board 40 is analyzed with respect to tolerances, both in regard to tolerances of hole diameter resulting from the drilling and plating processes compared to the nominal diameter, and also to tolerances of hole position compared to an exactly positioned hole. For example, the worst case for hole tolerances with regard to insertion of a post section of a connector, occurs when the hole is the smallest possible size within manufacturing tolerances and when the hole is off-center, or displaced, from the truly centered position. When all positions are considered for a hole of minimum diameter, a region results which is the overlap of all the possible off-center holes whose boundary is termed herein the "maximum material condition" or "MMC" boundary; there is guaranteed to be an opening within this boundary at this hole position no matter which condition exists for the hole within permissible tolerances.

In FIG. 18 a post section is considered, viewing the side surface outline of the larger dimension post section 110, and seeing the reduced dimension tip 112 (for a rectangular post section such as of power contact 100 of FIG. 7). Therearound is seen a circle representing the MMC boundary from FIG. 17, the guaranteed opening of an actual printed circuit board hole 36 with which the post section 110 is associated and into and through which it will be inserted. The tip section is shown as the maximum dimension resulting from the manufacture of the power contact; the dimensions of a post section 110 of smallest width $W_P$ and thickness $T_P$ are seen in solid; such "least material condition" post section is most likely to result in an off-center tip section. Also shown is the most off-center position of a tip section 112 from its nominal or true position within a rectangular zone contained by the MMC boundary or guaranteed open area of a corresponding through-hole. Dimension A is calculated which is the displacement in the "thickness" direction of the off-center tip, while dimension B is the displacement in the "width" direction thereof.

Finally, in FIG. 19 the optimized maximum post-receiving aperture dimensions are calculated utilizing the information attained from FIGS. 17 and 18. In accordance with the present invention, aperture width $W_A$ is calculated as follows:

$$W_A = W_P + 2 \times B$$

and aperture "thickness" $T_A$ is calculated as follows:

$$T_A = T_P = 2 \times A.$$

Figure 20:
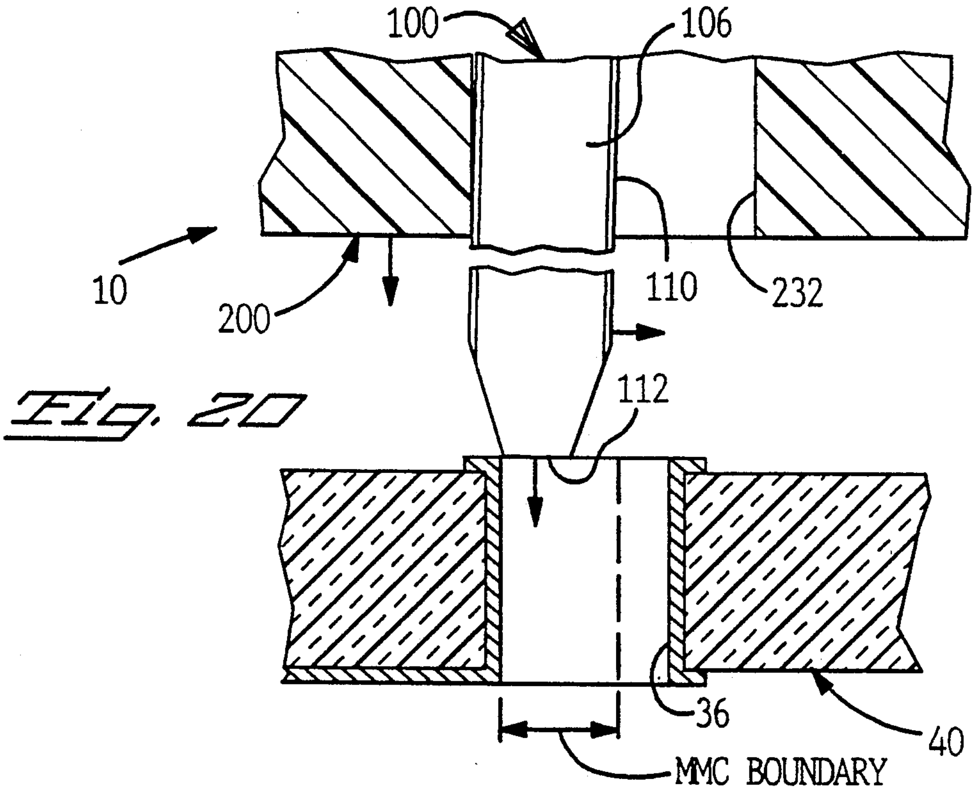
FIG. 20 is an enlarged section view of a post section of connector 10 poised to be inserted through a board through-hole, with the through-hole being at extreme small size and displacement within tolerance, and the post section being extreme small size and displacement within tolerance, in a worst case for board mounting using the present invention.

As a result of establishing the aperture size in this manner, and with reference to FIG. 20 for illustration, a post section 106 having the most likelihood of its tip section 112 not entering a hole 36, will be constrained by side surfaces of aperture 232 upon assembly of connector 10 in such a manner that not only is its tip assured to enter the corresponding through-hole upon board mounting, but that the post section will pass through the hole without interference therewith of a level sufficient to hinder board mounting. IN FIG. 20, through-hole 36 is shown offcenter to the right with the MMC boundary defined along the left side thereof, while post section 110 in aperture 232 of post locating member 200 is offcenter to the left and against the aperture side wall. Even though the post section is against the aperture side walls, tip section 112 is still assured of entering board hole 36; narrow post section 110 may bear against the side of hole 36 after tip section 112 initially enters but it would only be urged thereby in a direction always away from the aperture walls and toward an open region of aperture 232, and thus is assured to be able to float within the aperture. With all the post sections thus so disposed in optimum post-receiving apertures, the connector is assured of being mountable to the board without difficulty from its post sections.

For example, a nominal through-hole diameter may be 0.040 inches with a tolerance of 0.003 inches; the position tolerance of centered hole is 0.003 inches in any direction. The diameter of the MMC boundary would be based on the smallest hole diameter (which is 0.037 inches) and is further reduced by twice the displacement tolerance (which is 0.006 inches, additive to compensate for opposing directions), so that the MMC boundary diameter is 0.040 minus 0.003 minus 0.006, or 0.031 inches.

A nominal post thickness is 0.018 inches (and a tolerance of 0.0003 inches), post width is 0.026 inches (tolerance of 0.003 inches), and tip section of 0.010 inches (tolerance of 0.003 inches). Therefore, the dimensions of the smallest post section in this instance would be that post thickness $T_P$ would be 0.0177 inches and post width $W_P$ would be 0.0230 inches.

Permissible displacement of the tip section to the MMC boundary yields a dimension A in the thickness direction of 0.0045 inches, and a dimension B in the width direction of 0.0048 inches. Therefore, the dimension of the optimum aperture, or LMC boundary, in the thickness direction is 0.018 minus 0.0003 plus 0.009, or $T_A$ equals 0.0267 inches; the optimum aperture dimension in the width direction is 0.026 minus 0.003 plus 0.0096, or $W_A$ equals 0.0326 inches.

For the sensor posts the MMC would still have the diameter of 0.031 inches as with the post sections of the power contacts. With a square post of nominal dimensions of 0.025×0.025 inches and tip section dimensions of 0.006×0.006 inches and material and displacement tolerances of 0.001 inches, the analogous $T_P$ and $W_P$ would both be 0.0240 inches; the analogous A and B would both be 0.0064 inches; and the resultant $T_A$ and $W_A$ would both be 0.0368 inches.

Variations may be devised which are within the spirit of the invention and the scope of the claims. For example, the post sections may be square instead of rectangular, or round instead of either square or rectangular: the method of the present invention would be easily adaptable to such arrangements.

What is claimed is:

1. A method of providing post apertures in a locating section of an electrical connector including a plurality of contacts each having post sections extending from the locating section to be inserted into and through corresponding through-holes of a circuit board for electrical connection to conductive circuits thereof, the through-holes having nominal diameters and nominal centerline spacing in a selected array, comprising the steps of:

establishing tolerance limits for the through-hole diameter and for variance from the nominal centerline of a particular through-hole;

defining a boundary around the minimum opening by calculating the least permissible diameter within tolerance and subtracting therefrom a value equal to twice the permissible displacement tolerance of the centerline from nominal, within tolerance;

establishing the nominal dimensions and the tolerance limits for the dimensions of a post section of a contact of the connector;

determining the maximum permissible displacement in all directions of a said post section of minimum cross-sectional size within tolerance relative to the minimum opening boundary when centered with respect to the nominal center of minimum opening boundary, within which the tip of the post section will remain inside the minimum opening boundary upon connector mounting;

defining a boundary by calculating the limit in all directions of the addition of the maximum permissible displacement of said post section to the nominal wall locations of a post section when centered with respect to said minimum opening boundary, the boundary defining an envelope for a maximum aperture; and molding a post locating section of the connector with post-receiving apertures each matching a said maximum aperture envelope and centered to correspond with the nominal centers of the corresponding through-holes of the selected array, whereby post sections of said contacts extending through said post-receiving apertures are assuredly positioned to be received into corresponding ones of said through-holes even with said through-holes and said post sections being at relatively adverse extremes of dimension and displacement tolerances, with any necessary lateral adjustment within a said aperture of a said post section for full insertion into a said through-hole being assuredly in a direction away from engagement with an aperture wall.

* * * * *